US006586109B2

(12) United States Patent
Ray

(10) Patent No.: US 6,586,109 B2
(45) Date of Patent: Jul. 1, 2003

(54) FIRE RETARDANT CELLULOSE PRESERVATIVE TREATMENT PROCESS

(75) Inventor: James N. Ray, Milton, FL (US)

(73) Assignee: Premier Wood Treating, LLC, Valdosta, GA (US)

( * ) Notice: Subject to any disclaimer, the term of this patent is extended or adjusted under 35 U.S.C. 154(b) by 0 days.

(21) Appl. No.: 09/961,004

(22) Filed: Sep. 21, 2001

(65) Prior Publication Data

US 2003/0059638 A1 Mar. 27, 2003

(51) Int. Cl.7 ............................................... B32B 21/04

(52) U.S. Cl. .................... 428/537.1; 428/532; 428/533; 428/535; 428/536; 106/18.12; 252/601; 252/602

(58) Field of Search ................................ 428/532, 533, 428/535, 536, 537.1; 106/18.12; 252/601, 607

(56) References Cited

U.S. PATENT DOCUMENTS

| | | | | |
|---|---|---|---|---|
| 1,136,370 A | | 4/1915 | Scharwarth | 442/68 |
| 1,396,264 A | | 11/1921 | DiFilippo | 252/607 |
| 2,420,644 A | | 5/1947 | Athy et al. | 442/140 |
| 3,306,765 A | | 2/1967 | DuFresne et al. | 428/541 |
| 3,874,908 A | | 4/1975 | Liddell | 427/345 |
| 4,038,086 A | | 7/1977 | Clarke et al. | 106/18.31 |
| 4,046,955 A | * | 9/1977 | Bye | 428/478.4 |
| 4,095,985 A | | 6/1978 | Brown | 106/18.11 |
| 4,141,745 A | * | 2/1979 | Bye | 106/156.4 |
| 4,597,940 A | | 7/1986 | Hager | 422/32 |
| 4,886,548 A | | 12/1989 | Helmstetter | 106/18.12 |
| 5,035,951 A | | 7/1991 | Dimanshteyn | 428/446 |
| 5,360,586 A | * | 11/1994 | Wyatt | 264/54 |
| 5,453,119 A | * | 9/1995 | Helmstetter | 106/18.12 |
| 5,478,598 A | | 12/1995 | Shiozawa | 427/297 |
| 5,549,739 A | | 8/1996 | Inoue et al. | 106/15.05 |
| 5,612,094 A | | 3/1997 | Schubert et al. | 427/397 |
| 5,652,023 A | | 7/1997 | Bergervoet et al. | 427/287 |
| 5,672,390 A | | 9/1997 | Crews, IV et al. | 427/307 |
| 5,840,105 A | | 11/1998 | Helmstetter | 106/18.12 |
| 6,066,198 A | | 5/2000 | Cuevas B. | 106/18.12 |
| 6,146,766 A | | 11/2000 | Slimak et al. | 428/453 |

FOREIGN PATENT DOCUMENTS

| | | |
|---|---|---|
| DE | 197 46 701 a1 | 4/1998 |
| FR | 2 559 146 | 8/1985 |
| GB | 990834 | 5/1965 |
| WO | WO 88/00114 | 1/1988 |
| WO | WO 98/18872 | 5/1998 |

* cited by examiner

*Primary Examiner*—Leszek Kiliman
(74) *Attorney, Agent, or Firm*—Langdale & Vallotton, LLP; John P. Sinnott

(57) ABSTRACT

A method for not only preserving cellulose material from deterioration and from fire, but also for producing plywood, chip and particle aborad with an inexpensive and environmentally acceptable adhesive is described. The cellulose material is processed by spraying, immersing or being subjected to vacuum and pressure application in two steps. One step processes the cellulose material with a sodium silicate preservative solution. Another step processes the cellulose material with a gaseous carbon dioxide. Pressure application, moreover, can be varied in a range not to exceed 250 psi to improve product quality. Moistened cellulose material, treated in the foregoing manner, is coated with a comminuted protein, e.g. soybean meal, and pressed into a cellulose product, typically plywood and chip board.

31 Claims, 3 Drawing Sheets

FIRE RETARDANT CELLULOSE PRESERVATIVE TREATMENT PROCESS

CROSS-REFERENCE TO RELATED APPLICATIONS

None.

STATEMENT REGARDING FEDERALLY SPONSORED RESEARCH AND DEVELOPMENT

None.

REFERENCE TO "MICROFICHE APPENDIX"

None.

FIELD OF THE INVENTION

This invention relates to materials and processes for producing cellulose products and for protecting cellulose matter from fire, deterioration, and the like.

BACKGROUND OF THE INVENTION

Application of sodium silicate and a fire retardant to cellulose material, of which wood and wood products are typical, in order to protect the material from fire and from deterioration through fungus, rot, and insect attack, for example, is a well-known practice. One illustrative technique first exposes the wood to a vacuum. The wood then is subjected to a mixture of sodium silicate and a fire retardant mixture under a pressure of 300 pounds per square inch. Another process coats a wood surface with an alkali metal silicate and a carbonate in order to preserve the wood and to provide fire protection. And still another process provides for the application to plywood of an aqueous solution that combines ten materials, including sodium bicarbonate and sodium silicate.

None of these treatment compositions or processes, however, are entirely satisfactory. Illustratively, the sodium silicate, which is a primary protection for cellulose materials from deterioration through fungus and insect attack, if only superficially applied to the wood, swiftly erodes. Or if the sodium silicate penetrates the wood to some depth, subsequent immersion in water, for example, causes the sodium silicate to leach out of the cellulose structure, thus leaving the wood as unprotected as if it had not been treated at all.

Cellulose, or wood product manufacture, such as the production of chip board, particle board (e.g. oriented strand board) and plywood, require an adhesive to bond together the chips, particles or layered plies into a solid structure. Ordinarily, a resinous adhesive is used for this purpose.

These adhesives, however, are subject to a number of disadvantages. Many of these adhesives are, for example, costly; produce undesirable formaldehyde emissions; and are environmentally harmful.

There also is the continuing and unsatisfied long-term need, described above, to protect the cellulose material in the product from rot, fungus and insect attack.

Consequently, there is a need for an improved wood preservative and fire retardant treatment technique for cellulose materials and an inexpensive wood product adhesive that enjoys chemical compatibility with the environment, the preservatives and the fire retardant.

BRIEF SUMMARY OF THE INVENTION

These and other problems that have characterized the prior art are overcome, to a large extent, through the practice of the invention. For example, first immersing, spraying or subjecting to a vacuum and then pressure treating the cellulose material with a wood preservative, e.g. an aqueous solution of sodium silicate, that has been heated to about 180° F. not only establishes the protection from deterioration that is inherent in the preservative, but, because of the high temperature of the preservative during application, also kills bacteria that are harmful to the cellulose.

Subsequently, the cellulose matter that has been treated with the heated preservative is allowed to cool to a suitable temperature of about 112° F., or less. A solution of sodium bicarbonate is then applied by immersion; vacuum and pressure treatment; or sprayed onto the cellulose matter.

The product, heated to about 112° F. toward the end of the sodium bicarbonate treatment step, moreover, causes the treating substances to polymerize into an insoluble gel, a condition that enhances the insolubility of the preservative and the fire retardant that have been absorbed within the wood thereby significantly increasing the duration of the product's protection.

The insoluble gel prevents the preservative from erosion or from leaching out of the cellulose matter as a consequence of subsequent exposure to water, and the like. The gel also imparts a fire retardant feature, in that the sodium bicarbonate, in the gel, on exposure to a temperature of about 112° F. or more, evolves a carbon dioxide gas that retards and suppresses combustion.

The invention also contemplates other methods for applying a fire retardant to the cellulose material. For example, after the cellulose material has been impregnated with hot sodium silicate preservative solution through the illustrative combination of vacuum and pressure treatment described above, a carbon dioxide gas then is applied directly to the material. The carbon dioxide gas forms, with the sodium silicate, a gel that not only prevents the sodium silicate from eroding or leaching out of the cellulose matrix, but also enables carbon dioxide gas to discharge from the gel and matrix, in order to suppress combustion.

With respect to cellulose product manufacture, moreover, chips, particles or individual plies are immersed, sprayed or vacuum and pressure treated, as described above, with a suitable preservative compound. The chips, particles or plies, moistened through the preservative treatment, are then coated, preferably by spraying the moistened chips or the like, with a suitable, environmentally acceptable adhesive, e.g. soybean or cottonseed meal or protein. The coated material is then heated to a temperature of not less than 212° F. and pressed, depending on the product, to production pressure that is customary within the industry to form the specific product. Thus, in accordance with another feature of the invention, the comminuted meal provides an inexpensive and environmentally acceptable adhesive or bonding agent.

The process steps of immersion, spraying or vacuum and pressure treatment are, from the standpoint of the invention, essentially interchangeable. Consequently, for the purpose of this description and the appended claims, the word "processing," as used herein, is limited to and encompasses the steps either of immersion; or spraying; or vacuum and pressure treatment, unless stated otherwise in this text. Thus, for example, it is within the scope of the invention to apply the preservative to the cellulose material through immersion and to apply the fire retardant sodium bicarbonate through spraying or vacuum and pressure treatment. The sodium silicate preservative, moreover, can be applied to the cellulose material through, for instance, spraying or vacuum and pressure treatment with the sodium bicarbonate added by means of immersion.

With respect to pressure treatment, and entirely independent of and separate from any particular preservative or fire retardant, it has been found that reagent penetration, absorption, and accumulation within the cellulose structure is markedly improved by varying the pressure that is applied to the cellulose material that is being treated. Further in this same connection, by cycling the pressure of, for example, an aqueous solution of sodium silicate that is applied to a wood product through a range of pressures between 250 pounds per square inch (psi) in one or more cycles, mineral deposits in the wood are loosened, enabling more wood preservative, fire retardant and the like to be absorbed within the wood structure.

These and other features and advantages of the invention will be understood in more detail through the following description of preferred embodiment of the invention when taken with the figures of the drawing. The scope of the invention, however, is limited only through the claim appended hereto.

DETAILED DESCRIPTION OF THE PREFERRED EMBODIMENTS

Figure 1:
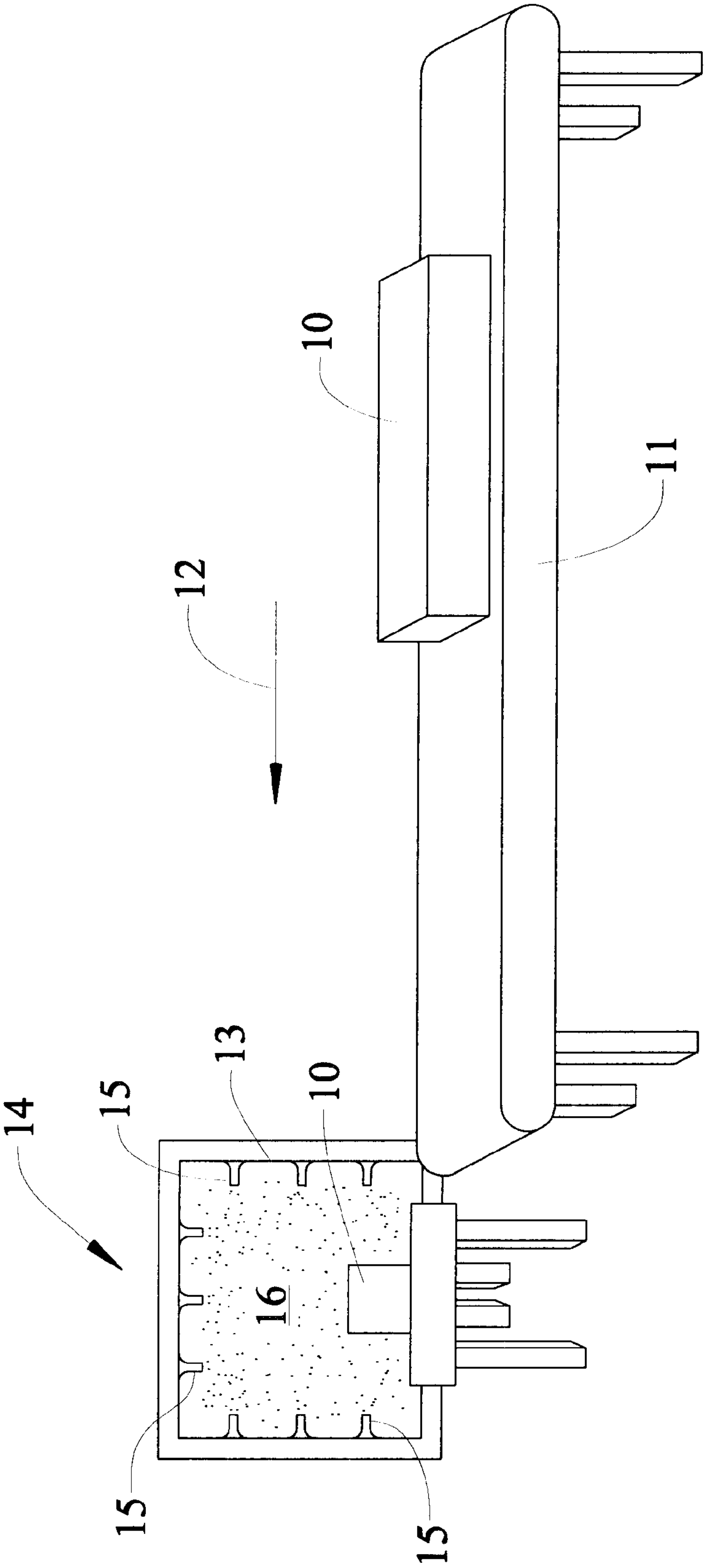
FIG. 1 in a schematic diagram of an illustrative spray booth for use in connection with the invention.

The inadequacies of wood preservative and fire retardant treatment techniques that have characterized the prior art are overcome, to a large extent, through the practice of the invention. For example, attention is invited to FIG. 1 which shows a wood or cellulose product, such as a wooden railroad tie 10 on a horizontal conveyor 11. The conveyor 11 moves the tie 10 in the direction of arrow 12 toward open end 13 of spray booth 14. Within the spray booth 14 nozzles 15 protrude inwardly toward the interior of the spray booth 14 in order to distribute a spray 16 of a suitable cellulose or wood preservative over the entire tie 10, the spray nozzles that are oriented upwardly from the bottom of the spray booth 14 toward the bottom of the tie 10 of not being shown in FIG. 1 of the drawing.

Then spray 16, preferably an aqueous solution of sodium silicate in an illustrative range of 5 percent to 50 percent by weight of sodium silicate to water, is heated before application to the tie 10 within the spray booth 14 to provide a spray temperature of about 180° F. The temperature of 180° F. is preferred for the purpose of the invention because it destroys essentially all bacteria that otherwise would have been harmful to the cellulose material in the tie 10. An additional environmentally acceptable preservative, e.g. a borate, also can be added to the sodium silicate in the spray 16.

Figure 2:
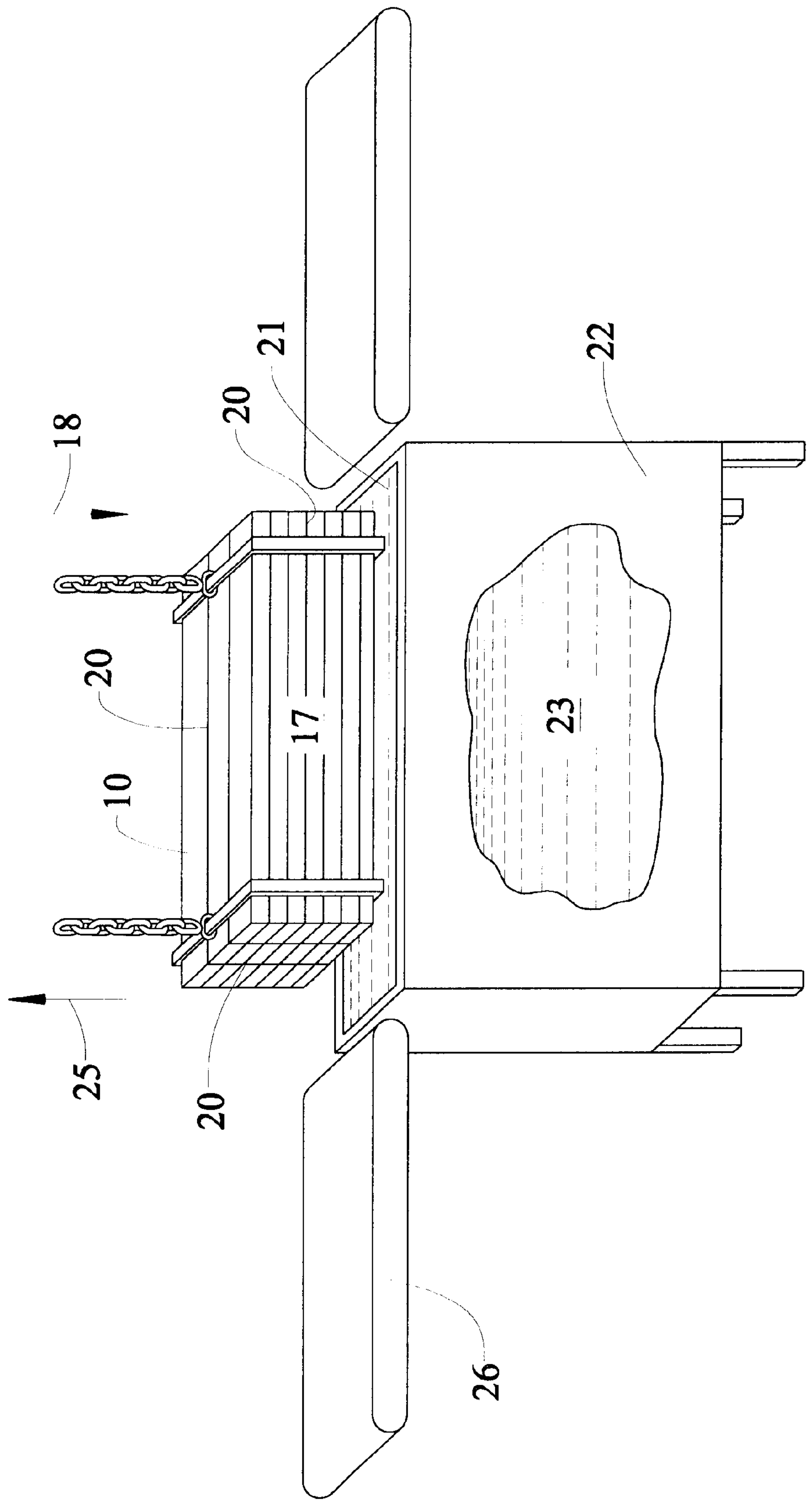
FIG. 2 is a schematic diagram of an illustrative dip tank, from which a portion of one side of the tank has been broken away to show the interior thereof, for use with the spray booth shown in FIG. 1.

The tie 10, after being exposed thoroughly to the spray 16 in the spray booth 14 is allowed to cool to a temperature of about 112° F., or less. After this tie 10 has cooled to 112° F., or less, the tie 10 is combined, as shown in FIG. 2, with several other railroad ties into a bundle of ties 17. As illustrated in FIG. 2 the individual ties 10 in the bundle 17 are spaced from each other to form gaps 20 by means of small spacers, or the like (not shown in the drawing).

The bundle 17 is lowered, in the direction of arrow 18, through an opening 21 in a dip tank 22 that holds a solution of sodium bicarbonate and water 23 in an illustrative proportion of about one teaspoon of sodium bicarbonate to 8 ounces of water. Thus, the bundle 17 is completely immersed in the sodium bicarbonate solution, enabling the solution to flow through the gaps 20 and to wet fully each of the ties, except for small areas on the surface of the ties in the bundle 17 that are marked by the spacers (not shown in the drawing). Naturally, if a complete application of the solution 23 to the ties is required, each tie can be separately immersed in the solution 23, thereby avoiding the masking effect of the spacers on a portion of the tie surfaces.

Note in this respect that immersion, as illustrated in FIG. 2, spraying, as shown in FIG. 1 and vacuum/pressure treatment shown in FIG. 3, as described subsequently in more detail and as described in my pending U.S. patent application Ser. No. 09/766,385 filed Jan. 19, 2001 for "Cellulose Preservative Method and Apparatus," each are suitable for application to the individual process steps described herein. For example, the tie 10 can be treated with the sodium silicate preservative through immersion. The preservative treated tie 10, moreover, can be subjected to sodium bicarbonate application through spraying.

Figure 3:
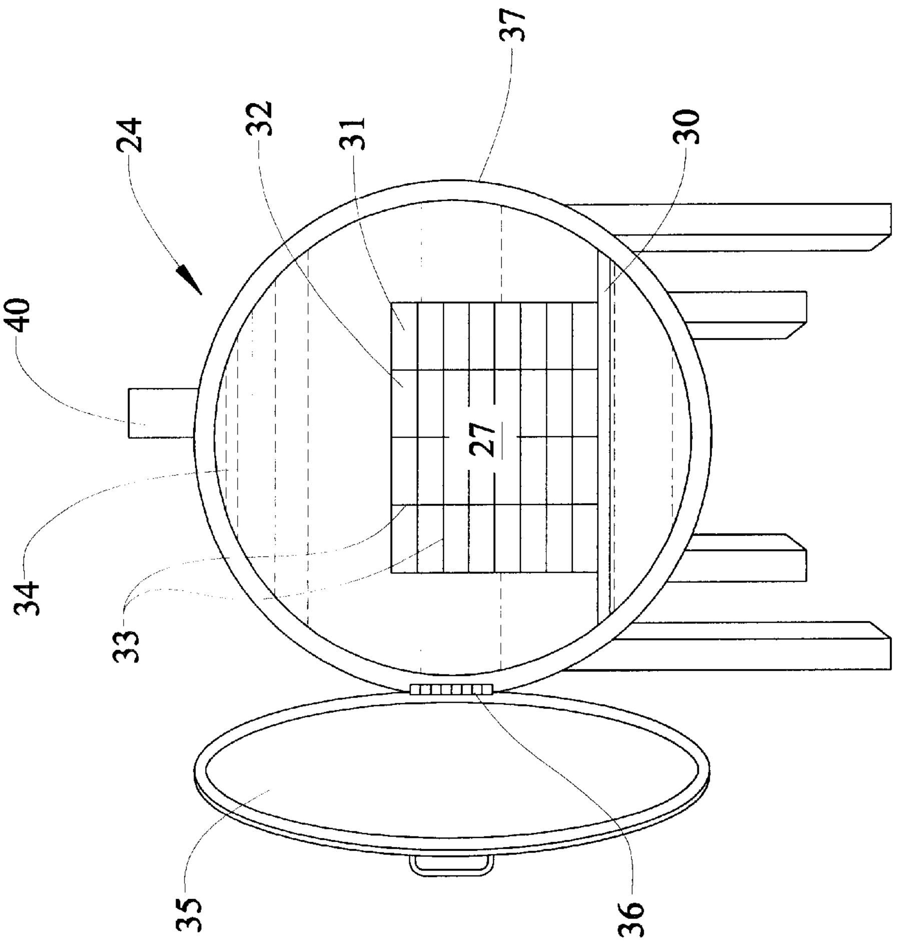
FIG. 3 is a front elevation of a typical apparatus for use with the invention.

The sodium silicate treatment step and the sodium bicarbonate step individually, or both together also can be accomplished through the vacuum and pressure treatment apparatus shower in FIG. 3 and described in the aforementioned '385 patent application.

The choice of spray, immersion or vacuum and pressure treatment is based on a number of technical considerations, of which the type wood that is being treated is illustrative. For instance, hardwoods and softwoods can be treated by means of spraying or immersion with acceptable preservative and fire retardant results. Vacuum and pressure treatment, however, is primarily useful when treating hardwoods and woods such as southern yellow pine. Application of preservatives and fire retardants through the vacuum and pressure treatment techniques to softwoods, in contrast, produces a product that is not fully satisfactory.

It will be recalled that the sodium silicate and sodium bicarbonate combine to form an insoluble gel. For this reason, in general, the sodium silicate spray 16 (FIG. 1) is applied to the tie 10 separately from the application of sodium bicarbonate. Mixing the two reagents in order to apply the combination to the tie 10 in a single step immediately produces a gel within the mixture and thus fails to provide a satisfactory gel coating because gel formed in the mixture would block the penetration of the preservative into the wood by suspending the preservative in a gel formed outside of the wood matrix rather than within and on the surface of the tie 10.

Further in this respect, to better eliminate harmful, wood destroying bacteria, it is preferred to apply the sodium silicate solution 16 to the tie 10 at a temperature of about 180° F. The sodium silicate/sodium bicarbonate gel, however, when properly applied, emits carbon dioxide gas at a temperature of 112° F. Consequently, if the benefit of the anti-bacterial action provided by the sodium silicate spray, heated to 180° F., is desired, then the sodium silicate treated tie 10 first must be cooled to a temperature in the range of 112° F., in order to avoid a premature emission of carbon dioxide gas as the gel is being formed with the ties in the bundle 17 (FIG. 2) during sodium bicarbonate application.

It is the emission of combustion suppressing carbon dioxide gas from the sodium silicate/sodium bicarbonate gel, moreover, that imparts a fire retardant feature to wood or cellulose products treated in accordance with the invention.

After the bundle of ties 17 is withdrawn from the dip tank 22 by lifting the bundle of ties 20 upwardly in the direction of arrow 25, the bundle of ties 17 is lowered onto conveyor 26 for drying and storage or shipping, as appropriate Attention now is invited to pressure vessel 24 shown in FIG. 3. It will be recalled that, preferably for hardwoods, either the sodium silicate treatment, the sodium bicarbonate application or both of these steps in the process can be accomplished through the vacuum and pressurization process described in my '385 patent application. Thus, within the pressure vessel 24 a stack of lumber 27 is mounted on a pallet 30. In the illustrative stack of lumber 27, individual planks 31, 32 are spaced from each other by means of a network of gaps 33 that enable a vacuum to be drawn within the pressure vessel 24 and the preservative 34 to contact each surface of every one of the planks 31, 32 in the lumber stack 27.

A hatch cover 35 is joined by hinge 36 to an open end of a cylindrical tank 37 to permit the stack of planks 27 to be placed on the pallet 30 within the tank 37 and then to close the open end of the tank 37 in an essentially air-tight manner thus forming the pressure vessel 24. In this way, the stack of lumber 27 is selectively sealed within the pressure vessel 24, enabling a vacuum of about 27 inches of mercury to be drawn within the pressure vessel 24.

Drawing this vacuum within the pressure vessel makes the cellulose material in the stacked lumber 27 become porous or better capable of absorbing the preservative 34 within the cellulose matrixes of the individual planks 31, 32. Having prepared the lumber within the stack 27 in the foregoing manner, the sodium silicate preservative 34, heated to about 180° F. is flooded into the pressure vessel 24 in order to flow through the gaps 33 among the planks 31, 32 in the stack of lumber 27. The hydraulic pressure within the pressure vessel 24 is increased until it reaches a maximum of about 250 pounds per square inch. In this way, the preservative 34 is absorbed within the porous cellulose structure of the individual planks 31, 32. To increase the hydraulic pressure much beyond the illustrative level of 250 pounds per square inch, it should be noted, would have the negative effect of destroying the cellulose structure that forms the wood matrix, and for that reason, the hydraulic pressure within the pressure vessel 24 should approximate a maximum of about 250 pounds per square inch.

With respect to pressurizing the lumber in the stack 27, it has been found that significantly improved results are achieved by cycling the pressure of the preservative 34 (or other reagent) through a range between 140 psi to 250 psi.

Illustratively, it has been found that the pressure of the preservative 34 should be raised to 250 psi and held at that pressure for 30 minutes. The pressure of the preservative then should be cycled, or repeated between 140 psi and 250 psi for two and one half hours, finally raising the preservative pressure to 250 psi for a last 30 minutes. Pressure control means, as illustrated through gate valve 40 on the pressure vessel 24 that is in fluid communication with the interior of the pressure vessel 24 are activated selectively to enable the pressure of the preservative 34 within the pressure vessel 24 to be reduced in accordance with the foregoing illustrative pressure control scheme. Manipulating reagent pressure within the vessel 24, with a maximum pressure of about 250 psi can be tailored to match the requirements of selected preservatives, fire retardants and the like to the specific cellulose material or product that is being treated.

Upon completion of the foregoing preservative treatment step, the pressure is relieved within the pressure vessel 24 and the preservative 34 is drained from it. A suitable chemical acid wash is applied to neutralize the interior of the pressure vessel 24, or the stack of lumber 27 is transferred to a fresh pressure vessel (not shown in the drawing). The stack of lumber 27, preferably, can remain within the acid washed pressure vessel 24 and an aqueous solution of sodium bicarbonate is pumped into the pressure vessel 24. In this manner the solution of sodium bicarbonate and water flows around the individual planks 31, 32 in the stack 27 in order to react with the absorbed sodium silicate and form a water-impervious gel on and within the planks 31, 32.

As an alternative, instead of pressure treating the stack of lumber 27 with the aqueous solution of sodium bicarbonate, as described immediately above, the cylindrical tank 37 can be filled with carbon dioxide gas at a pressure not to exceed 250 pounds per square inch. The carbon dioxide gas, as it is being absorbed under pressure within the cellulose matrices of the planks 31, 32 react with the sodium silicate preservative that penetrated these matrices in the preceding process step to form, with the sodium silicate, a water insoluble gel. This gel, as mentioned above, essentially fixes the sodium silicate preservative within the cellulose matrix along with the balance of the carbon dioxide that did not react with the sodium silicate to form the gel. Consequently, on exposing the fully treated planks 31, 32 to a combustion temperature for these planks, the carbon dioxide gas is expelled from the cellulose structure of the planks 31, 32. The carbon dioxide so issuing from the planks 31, 32 suppresses combustion and, in this manner serves as a fire retardant for the planks 31, 32.

Wood products, as for example products made from wood fragments; sheets of wood, or plies; wood chips; wood particles and similar materials that are processed into plywood, oriented strand board and particle board for instance, each can be subjected to any combination of the two preservative and fire retardant application steps described above.

The wood product material, after it has been processed through the fire retardant application step of the process is in a moistened condition. While still moistened, the wood product material is coated by blowing or through other suitable means, applying a comminuted protein substance on the wood product material. Preferably, comminuted soybean meal can be adapted for the purpose of the invention, although comminuted cottonseed also has been used with good results in the same manner.

The wood product material, coated with the comminuted soybean meal is pressed to form plywood, oriented strand board, particle board, or the like using ordinary commercial processing standards with respect to curing times, temperatures, pressures and adhesive concentration. Thus, the protein serves as an excellent adhesive for the wood product material, binding the material into a useful wood product.

In this manner, a less expensive, better preserved, fire retarding, environmentally acceptable and biodegradable cellulose product is made available through the practice of the invention.

What is claimed is:

1. A method for protecting cellulose material comprising, in order, the steps of heating a cellulose preservative to about 180° F., spraying said preservative on the cellulose material, impregnating the cellulose material with said preservative, cooling said sprayed cellulose material to a temperature of about 112° F., and subsequently spraying sodium bicarbonate on said cooled cellulose material.

2. A method for protecting cellulose material comprising, in order, the steps of heating a cellulose preservative to about 180° F., spraying said preservative on the cellulose material, impregnating the cellulose material with said preservative, cooling said sprayed cellulose material to a temperature of about 112° F., and subsequently immersing said cooled cellulose material in sodium bicarbonate.

3. A method for protecting cellulose material comprising, in order, the steps of heating a cellulose preservative to about 180° F., immersing the cellulose material in said heated preservative, impregnating the cellulose material with said preservative, cooling said immersed cellulose material to a temperature of about 112° F. and subsequently spraying sodium bicarbonate on said cooled cellulose material.

4. A method for protecting cellulose material comprising, in order, the steps of heating a cellulose preservative to about 180° F., immersing the cellulose material in said heated preservative, impregnating the cellulose material with said preservative, cooling said immersed cellulose material to a temperature of about 112° F. and subsequently immersing said cooled cellulose material in sodium bicarbonate.

5. A method for protecting cellulose material comprising, in order, the steps of drawing a vacuum of approximately 27 inches of mercury on the cellulose material, applying a cellulose preservative to the cellulose material under a pressure of about 250 pounds per square inch, impregnating the cellulose material with said preservative, applying sodium bicarbonate under a pressure of about 250 pounds per square inch to the cellulose material, and drying the cellulose material.

6. A method for protecting cellulose material comprising the steps, in order, of drawing a vacuum of approximately 27 inches of mercury on the cellulose material, applying a cellulose preservative to the cellulose material under a pressure of about 250 pounds per square inch, impregnating the cellulose material with said preservative, and exposing the cellulose material to carbon dioxide gas.

7. A method for protecting cellulose material comprising the steps, in order, of heating a cellulose preservative to about 180° F., impregnating the cellulose material with said heated preservative, cooling said impregnated cellulose material to about 112° F., and subsequently processing said cooled cellulose material with sodium bicarbonate.

8. A method for protecting cellulose material according to claim 7 wherein said cellulose preservative comprises sodium silicate.

9. A method for protecting cellulose material according to claim 7 comprising the further step of applying a further cellulose preservative to said cooled cellulose material with said sodium bicarbonate.

10. A method for protecting cellulose material according to claim 9 wherein said further cellulose preservative comprises a borate.

11. A method for protecting cellulose material comprising, in order, the steps of heating a cellulose preservative to about 180° F., diffusing within the cellulose material said heated preservative, cooling said diffused cellulose material to about 112° F. and exposing said cooled and diffused cellulose material to carbon dioxide gas.

12. A method for producing a preserved and fire retardant wood product comprising, in order, the steps of heating a cellulose preservative to about 180° F., diffusing within the wood product said heated preservative, cooling said diffused wood product to about 112° F., applying to said cooled wood product sodium bicarbonate, applying a comminuted protein to said cooled and processed wood product, and pressing said comminuted powder into said processed wood product.

13. A method for producing a preserved and fire retardant wood product according to claim 12 wherein said comminuted protein is soybean.

14. A method for producing a preserved and fire retardant wood product according to claim 12 wherein said comminuted protein is cottonseed.

15. A method for producing a wood product from wood fragments comprising, in order, the steps of processing the wood fragments to establish fire and wood preservative protection therefore, applying a comminuted protein to said processed wood fragments and pressing said comminuted protein and said processed wood fragments together to form the wood product.

16. A method according to claim 15 wherein said protein further compromise soybean powder.

17. A method according to claim 15 wherein said protein further comprises cottonseed.

18. A wood product comprising cellulose material, a preservative to protect the wood product from deterioration diffused within the cellulose material, a fire retardant to suppress combustion for the wood product and comminuted protein to bind the cellulose material to form the wood product.

19. A wood product according to claim 18 wherein said protein is soybean meal.

20. A wood product according to claim 18 wherein said protein is comminuted cotton seed.

21. A method for protecting cellulose material comprising the steps, in order, of heating a cellulose preservative to about 180° F., diffusing said heated preservative within the cellulose material, cooling said diffused cellulose material to about 112° F., and processing said cellulose material with sodium bicarbonate, said processing being selected from steps consisting of spraying, immersing, applying vacuum and applying pressure to said diffused and processed cellulose material.

22. A method for producing a wood product from wood materials comprising the steps of applying a comminuted protein substance to the wood materials, and pressing the wood materials and said protein substance into the wood product.

23. A method according to claim 22 wherein said comminuted protein is soybean meal.

24. A method according to claim 22 wherein said comminuted protein is cotton seed.

25. A wood product comprising wood materials, and a comminuted protein adhesive for binding the wood materials into the wood product.

26. A wood product according to claim 25 in which the comminuted protein comprises soybean meal.

27. A wood product according to claim 25 in which the comminuted protein comprises cotton seed.

28. A cellulose material preservative process comprising the steps, in order, of applying the preservative to the cellulose material at a pressure of not more than about 250 pounds per square inch, reducing the preservative pressure to not less than about 140 pounds per square inch, and increasing, subsequently, the preservative pressure to not more than about 250 pounds per square inch.

29. A cellulose material preservative process according to claim 28 in which the step of applying the preservative to the material at a pressure of not more than about 250 pounds per square inch is continued for about 30 minutes.

30. A cellulose material preservative process according to claim 28 in which the steps of reducing the preservative pressure to not less than about 140 pounds per square inch, and increasing the preservative pressure to not more than about 250 pounds per square inch are repeated during a period of two and one half hours.

31. A cellulose material preservative process according to claim 28 further comprising the step of reducing the preservative pressure to atmospheric pressure after said preservative pressure of not more than 250 pounds per square inch has been continued for not more than 30 minutes.

* * * * *